UNITED STATES PATENT OFFICE.

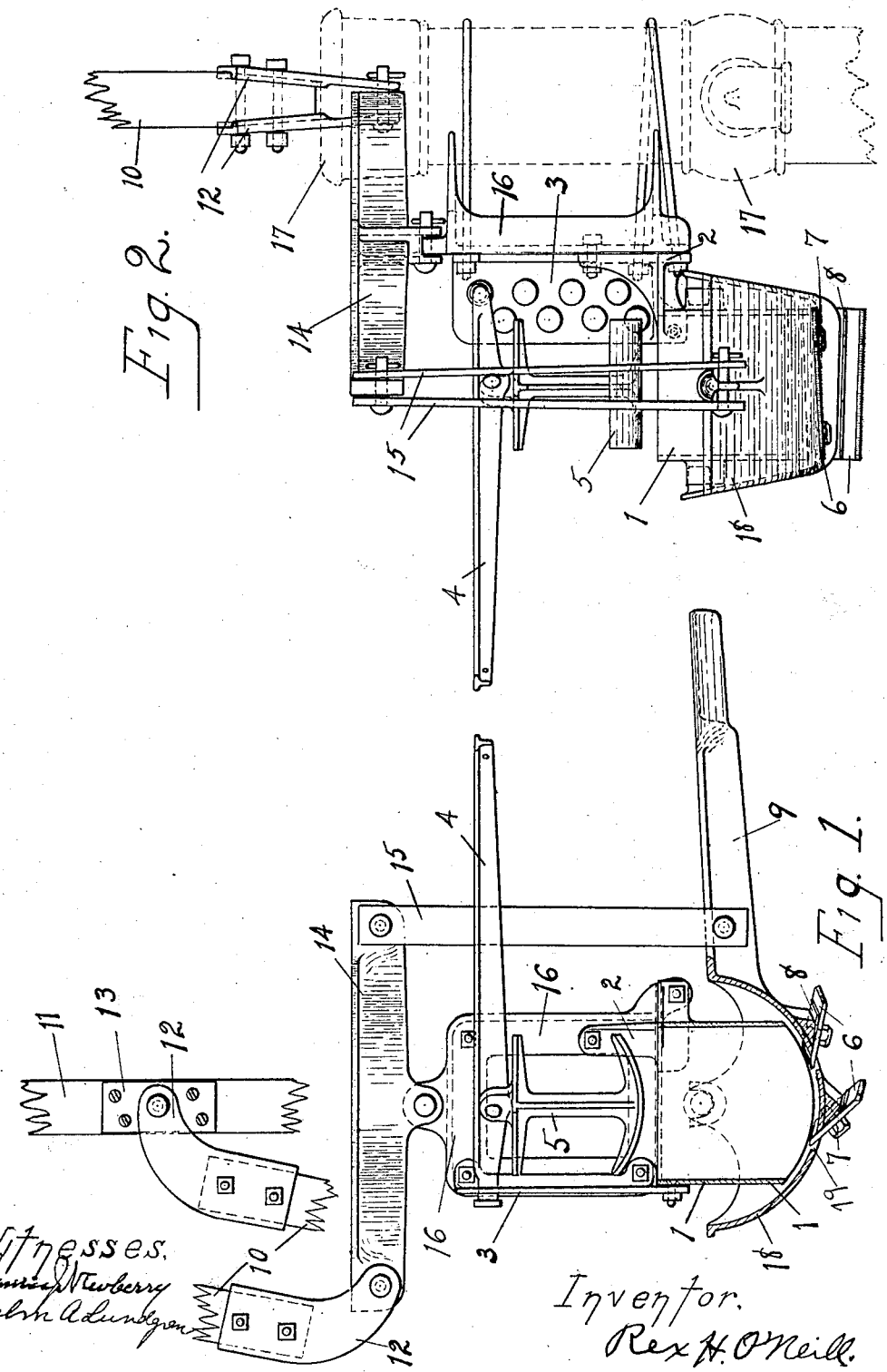

REX H. O'NEILL, OF CHICAGO, ILLINOIS.

MACHINE FOR CUTTING BONES AND OTHER MATERIALS.

No. 904,274.  Specification of Letters Patent.  Patented Nov. 17, 1908.

Application filed August 18, 1906. Serial No. 331,214.

*To all whom it may concern:*

Be it known that I, REX H. O'NEILL, a citizen of the United States, residing at Chicago, in the county of Cook and State of Illinois, have invented certain new and useful Improvements in Machines for Cutting Bones and other Materials, of which the following is a specification.

My invention relates to improvements in machines for cutting bones and other materials, which operate by successively cutting off small portions of the material as it is brought into contact with the cutting knives, thus reducing the material to a finely cut state.

The principal object of my invention is to provide a strong, durable, simple, economical and efficient machine for cutting bones and other materials.

Further objects of the invention are to provide a machine which is compact and constructed of the fewest possible number of parts, the parts being so constructed and arranged that as the machine becomes worn by use the parts will not interfere so as to cause friction, and the wearing surface will be reduced to a minimum; to provide a hopper adapted to contain the material to be operated upon, with a plunger or pressing foot having an operating lever and fulcrum for pressing the material through the hopper and into engagement with the cutting knives, such plunger, lever and fulcrum being so constructed and arranged that the maximum leverage and range of movement may be obtained, the plunger being provided with laterally extending guiding portions adapted to slidably engage the parallel walls of the hopper to prevent the tipping of the plunger or pressing foot and enable it to be moved into close proximity to the cutting knives without coming into actual contact therewith to the injury of the knives; to provide a machine which will admit and cut large undried and consequently tough bones and other rounded materials in an efficient manner; to provide means for operatively connecting the knife operating lever with the pump pole of an ordinary pumping wind mill, or other source of power; to provide a knife-holder in the form of a knife operating lever which is pivotally mounted upon the hopper and provided with a concave upper surface on the side toward or adjacent to and beneath the hopper, the knives being mounted upon such lever and projecting from such concave surface in the direction of the open bottom portion of the hopper and transversely of both the hopper and the lever upon which such knives are mounted at an oblique angle, whereby the required leverage may be obtained for enabling the knives to be operated manually, or otherwise as desired, in an efficient manner, and whereby the number of parts is reduced to a minimum, and the cutting capacity, efficiency and durability as well as the economy of construction and operation of the machine is increased.

Other and further objects of the invention will appear from an examination of the drawings and the following description and claims.

The invention consists in the features, combinations and details of construction hereinafter described and claimed.

In the accompanying drawings Figure 1 is a side view of a machine constructed in accordance with my improvements, and Fig. 2, is an end view of the same, showing the means for attaching the hopper laterally to a suitable support, the manner of mounting and adjusting the fulcrum end of the lever which operates the plunger for feeding the material through the hopper, and the means for connecting the cutter supporting and operating lever with a source of power, such as the pump pole of a wind-mill.

In constructing a machine in accordance with my improvements and adapted to accomplish the above mentioned objects, I provide a hopper 1, having side walls the inner surfaces of which are preferably parallel and upright. The hopper is open at top and bottom, the bottom being rounded, and a laterally projecting foot or supporting arm 2, extends laterally beyond one side thereof, and, with the fulcrum member or feeding-lever support 3, forms a support for the machine which is adapted to permit the free movement of the cutting knives and their supporting and operating lever beneath the open bottom end of the hopper during the operation of the machine.

The fulcrum member 3 is attached to the hopper and to the wall or other support, and has holes arranged in vertical rows to receive the end of the pressing or feeding lever 4. Pivoted to the said feeding lever is a feeding plunger or pressing foot 5 formed to fit and extend into the hopper, its length being such that it will not quite reach to the knives 6 when the lever 4 reaches its downward limit of movement or rests upon the hopper. The bottom of the feeding plunger is rounded so as to conform to the direction of movement of the cutting knives and their support, hereinafter described, and said plunger or pressing foot is provided with lateral projections or guiding arms near its upper end which are adapted to slidably engage the inner side walls of the hopper and keep the plunger or foot from tipping in the hopper and striking the knives.

Pivotally connected with the hopper on opposite sides thereof at points corresponding with the center from which a circular arc may be struck, corresponding with the rounded bottom end of the hopper, is a knife-holder or reciprocating knife-operating lever 18, which extends across the open bottom end of the hopper, and, during the operation of cutting, prevents the escape of the material from the hopper until it is cut and allowed to pass through slots 19, in said knife supporting and operating lever. The upper side of this knife-holder or knife supporting and operating lever at one end thereof, is concave and hollowed out beneath the pivotal points which are on opposite sides of the lever and hopper, and this concave upper surface portion of the lever extends beneath the hopper and to a considerable distance in front of and behind the hopper describing the arc of a circle the center of which is the pivotal points of the knife-holding element.

Slots 19 extend diagonally crosswise of the knife-supporting lever at the curved or concave portion thereof and are backed by relatively thick portions of the knife-supporting element, to give strength and afford a seat or bed for the knives 6 which extend through said slots and project upward beyond the concave portion of the knife supporting lever, in the direction of the open bottom end of the hopper, and obliquely with relation to the hopper. The knives are fastened in place by means of cap-screws or bolts 7, and are provided with fillers or adjusting plates 8, which are interposed between the knives and their seats so as to enable the knives to cut fine or coarse. These fillers may be placed between all portions or different portions of the respective knives and their seats, and may be adjusted or mounted at different distances from the cutting edge so as to adjust the pitch or inclination of the knife and thereby cause them to cut fine or coarse as desired. It is evident that one or more knives may be used, and that by placing them obliquely across the knife-support they will cut more easily than if placed squarely across it. I prefer knives having serrated cutting edges, although knives having smooth or straight edges may be used if desired on account of lower cost. The knives are beveled principally upon one side and slightly upon the other, to give strength to the cutting edge and enable them to be readily sharpened by using a whetstone or oil-stone on their slightly beveled side.

The knife supporting element being concave on its upper side—the side toward the open bottom end of the hopper—and bones, especially large bones, being rounded to such an extent as to affect the extent or area of the surface with which the knives may come in cutting contact, it is evident that the knives will cut off much more bone in one pass or in a given number of passes than will knives which are moved in a plane or in a circular path the center of which is on the side of the knives opposite to the bones or hopper. This is particularly true during the cutting of that portion of a large bone, or of several bones which first comes into contact with the cutting edges of the knives. I prefer to have the knives both slant in the same direction, when more than one is used, and, in any case it is preferable to have the knife or knives slant upward at an angle and in the direction of their movement while the handle or extended portion 9 of the operating lever upon which they are mounted is moving downward, so that the knives are pushed rather than pulled while cutting.

The connecting arm 10, the ends only of which are shown, is for use when the machine is mechanically operated, and is shown attached to the pump-pole 11 of a wind-mill and to the rocker arm 14 by means of the connecting plates 12. The wear-plates 13 are placed on the pump-pole to prevent excessive wear and give strength. Straps 15 connect the rocker-arm 14 with the operating or extended handle portion 9 of the knife supporting and operating lever 18. The rocker-arm 14 is pivoted to the supporting bracket portion or yoke 16, and it is adapted to bring the cutting stroke of the knives 6 on the upward stroke of the pump-pole 11, and to enable the straps 15 and the connecting arm 10 to operate in a nearly vertical position. The pump-pole 11 is adapted to transmit more power without danger of breaking on its upward pull than on its downward thrust. An ordinary pump is shown in dotted lines in Fig. 2, and long bolts or clamps extend around it clamping the supporting yoke 16 and the machine in place. The knives are adjustable with relation to the knife seat longitudinally of the knives as well as to different angles.

I claim:

1. In a machine of the class described, the combination of a hopper, a knife-operating lever provided with a slotted knife-supporting portion extending across the discharge end of the hopper, such knife-supporting portion being concave on the side toward the hopper and provided with side portions extending on two opposite sides of the hopper and pivoted thereto at a distance from the discharge end of said hopper, a knife mounted upon the slotted knife-supporting portion of the knife-operating lever, and mechanism located at the end of the hopper opposite from the knives and adapted to force material through the hopper into position to be cut by the knives.

2. In a machine of the class described, the combination of a hopper, a knife-operating lever provided with a knife-holding portion extending beneath and having a concave side toward the hopper, means for pivotally supporting the knife-operating lever at points on opposite sides of the hopper above the level of the discharge end thereof, knives mounted upon the concave portion of the knife-operating lever beneath the hopper and adapted to swing with said lever and upon the same pivotal points, and plunger and lever mechanism located above the hopper in position to enable the plunger to enter the hopper for pressing material through the hopper into position to be cut by the knives.

3. In a machine of the class described the combination of a hopper, a knife-operating lever provided with a slotted knife-holding portion extending beneath and having a concave side toward the discharge end of the hopper, means for pivotally supporting the knife-operating lever and thereby the knives on the same pivotal points on opposite sides of the hopper and above the level of the discharge end thereof, a knife or knives mounted upon the concave portion of the knife-operating lever and adapted to swing with said lever and upon the same pivotal points, a feeding plunger extending into the hopper, an operating lever connected with said plunger, a fulcrum member upon which the plunger-operating lever is mounted, and means for operatively connecting the plunger-operating lever successively to different points upon the fulcrum member at different distances from the hopper.

4. In a machine of the class described the combination of a hopper, a knife-operating lever provided with a knife-holding portion having an upper concave surface toward and beneath the discharge end of the hopper, and provided with upwardly extending side portions on opposite sides of the hopper and pivotally attached to said opposite sides of the hopper above the hopper bottom, a knife mounted upon the concave portion of the knife-holding member, a feeding plunger mounted in the hopper and having a convex face and a central upright portion having laterally projecting guiding arms in sliding engagement with the walls of the hopper, a fulcrum member attached to and extending above the hopper, and a plunger operating lever pivotally connected with the feeding plunger and movable into and out of operative engagement with the fulcrum member at different points successively.

5. In a machine for cutting bones and other materials, in combination, a hopper having one end rounded, a slotted concave knife-holder pivoted to the hopper and adapted to swing in close proximity to the rounded end of said hopper preventing the material from falling out of said hopper faster than cut, a knife or knives fastened to said knife-holder with their cutting edges projecting through the slot or slots in said knife-holder, a projection or handle extending from said knife-holder by which motion may be imparted to it, a pressing-foot adapted to enter and force the material into said hopper, projections extending from the stem of said pressing-foot to engage the sides of said hopper and prevent said pressing-foot from tipping sidewise when near the bottom of said hopper, a lever pivoted to said pressing-foot, a fulcrum-member having a plurality of fulcrum points each of which is at a different distance from said hopper, said fulcrum-member being attached to said hopper in position to be readily engaged by said pressing-lever, projections extending from said hopper by which it may be attached to a wall or other upright support, and means for imparting motion to said knife-holder.

REX H. O'NEILL.

Witnesses:
 THOMAS J. NEWBERRY,
 JOHN A. SUNDGREN.